United States Patent
Barnes et al.

[11] 3,761,682
[45] Sept. 25, 1973

[54] CREDIT CARD AUTOMATIC CURRENCY DISPENSER

[75] Inventors: Thomas R. Barnes, Dallas; George R. Chastain, Irving; Don C. Wetzel, Dallas, all of Tex.

[73] Assignee: Docutel Corporation, Dallas, Tex.

[22] Filed: Oct. 7, 1971

[21] Appl. No.: 187,515

Related U.S. Application Data

[63] Continuation of Ser. No. 59,150, July 29, 1970.

[52] U.S. Cl. ......... 235/61.7 B, 221/206, 340/149 A
[51] Int. Cl. ..................... G06k 17/00, B65h 3/00
[58] Field of Search .............. 235/61.7 B, 61.7 R, 235/61.11 R, 61.11 D, 61.8 R; 340/149 A; 221/206, 312

[56] References Cited
UNITED STATES PATENTS

| | | | |
|---|---|---|---|
| 3,039,582 | 6/1962 | Simjian | 235/61.7 B |
| 3,184,714 | 5/1965 | Brown, Jr. et al. | 235/61.7 B |
| 3,212,615 | 10/1965 | Hellar, Jr. | 235/61.7 B |
| 3,221,304 | 11/1965 | Enikeieff et al. | 235/61.7 B |
| 3,287,543 | 11/1966 | Halpern | 235/61.12 M |
| 3,401,830 | 9/1968 | Mathews | 235/61.11 E |
| 3,560,715 | 2/1971 | Akamatsu et al. | 235/61.8 R |

*Primary Examiner*—Daryl W. Cook
*Attorney*—Richards, Harris & Hubbard

[57] ABSTRACT

A currency dispenser automatically delivers a medium of exchange in packets in response to a coded credit card presented thereto. The coded credit card is presented to the currency dispenser and an initial check is made to determine if the card has the proper format. After checking the credit card format, coded information thereon is evaluated to check the user's identity prior to authorizing him to receive cash from the machine. When each of several additional checks of the credit card code have been completed, the old code is removed and substituted with a new code. The new code contains the same information as the old but updated to reflect an additional currency dispensing transaction. Both the original code and the updated code are scrambled in accordance with a changing key. Scrambling the credit card code after each use thereof minimizes the chance of unauthorized use of the currency dispenser. When the checks of the credit card code indicate the user is entitled to receive the amount of currency he has selected, a storage container for the packets of currency transports the required number of packets by a positive feed drive to a cash drawer. The cash drawer opens to a detent position which allows the customer to then move the drawer to a fully open position to remove his currency. Upon release of the cash drawer, it returns to a partially opened position from which it automatically closes after a preset time limit.

46 Claims, 10 Drawing Figures

PATENTED SEP 25 1973 3,761,682

INVENTORS:
THOMAS R. BARNES
GEORGE R. CHASTAIN
DON C. WETZEL

Richards, Harris & Hubbard
ATTORNEYS

INVENTORS:
THOMAS R. BARNES
GEORGE R. CHASTAIN
DON C. WETZEL

Richards, Harris & Hubbard
ATTORNEYS

INVENTORS:
THOMAS R. BARNES
GEORGE R. CHASTAIN
DON C. WETZEL

Richards, Harris & Hubbard
ATTORNEYS

CREDIT CARD AUTOMATIC CURRENCY DISPENSER

This is a continuation of application Ser. No. 59,150, filed July 29, 1970.

This invention relates to a currency dispenser, and more particularly to a coded document-actuated currency dispenser.

Recent studies have shown that attempts are being made by the banking system to influence the general public to use fewer checks in their finanical transactions. This is primarily due to the difficulty of handling and processing large amounts of paper. In its place, there appears to be a wider use of credit cards for the completion of daily household and business transactions. Although there is a continued heavy use of checks and an increasing use of credit cards, we are not likely to become a cashless society in the near future. To provide the required amount of cash to complete some business and personal transactions, banks, in the past, have opened more and more branches for customer convenience. Unfortunately, the construction and operation of these many branch banks is expensive and unprofitable.

To provide the consumer with a source of ready cash without the expense of branch banking, banks are resorting to the use of automatic currency dispensing machines that make cash available to bank customers on a 24 hour basis.

Heretofore, the available automatic currency dispensing machines lacked compatibility with bank credit cards and the convenience and speed of data processing. With many of the prior currency dispensing machines, the customer was required to yield up his identification card with each use, thereby creating handling problems and costs for the bank which were of equal magnitude with the present day check handling problems and costs. Other available machines required the customer to carry a supply of check-like vouchers, which he and the bank must replenish periodically as required. Again, this presented many of the same problems currently experienced when handling checks. Of prime importance, of course, in the operation of any automatic money dispenser is the security of the stored cash. To be acceptable, an automatic cash dispenser must be essentially tamperproof.

An object of the present invention is to provide a coded document activated automatic dispenser. Another object of the present invention is to provide a code actuated automatic currency dispensing machine. A further object of this invention is to provide code scrambling security in a code actuated dispenser. Still another object of this invention is to provide positive feed delivery in automatic dispensing apparatus. A still further object of this invention is to provide controlled, timed, sequential operation of a dispensing drawer in automatic dispensing apparatus.

In an automatic dispenser, a coded document is presented to the machine by a user. Initially, the machine performs a format check on the document to determine if the machine will properly respond. If the coded document presented is not of the correct format, it will be locked out thereby protecting the machine from an attempt to force an unauthorized document into the mechanism. If the initial check indicates the presented document has the proper format, a gate opens to permit the user to further insert the document into the machine for actuation thereof.

Upon the acceptance of a coded document by the dispensing apparatus of the present invention, the document proceeds to a first station where scrambled coded information stored thereon is read and sent to unscrambling logic. A customer's personal identification code as read from the presented document is checked by comparision with a code manually inserted by the user. If the coded customer identification number and the inserted identification number do not agree, the user is instructed to re-enter his personal code. This operation will be repeated until the customer inserts the correct code or a favorable comparison does not result after three attempts. If on the third attempt the stored code and the entered code do not agree, the coded document is transported to an internal storage bin and not returned to the user. When the customer enters an identification code which corresponds to that stored on the document presented, the date of last use, the number of previous uses in the same day, the total number of uses remaining, and the expiration date of the document are all checked. If the result of these checks indicates the user is entitled to receive the article to be dispensed, he is so informed and the document is recorded, with the data thereon updated to reflect the latest transaction.

After the code on the document as presented is read and sent to the unscrambling logic, an unscrambler converts the data into a series of separate, logically arranged data words. These data words, after being checked and updated as explained previously, are rescrambled in accordance with a scrambling key to produce a code arrangement different from the arrangement as read. Upon completion of the rescrambling, the document is recoded with the updated scrambled data. The code changing logic also includes circuitry for generating a different scrambling key for subsequent readings of the same coded documents.

In an automatic dispenser in accordance with the present invention, after the coded document has been returned to a user, a positive feed delivery system removes the article to be dispensed from a storage container. The positive feed system includes an adjustable gate for accurately metering the dispensed article. After leaving the storage container through the metering gate, the article is transported between pinch rollers and a series of belted rollers to a dispensing drawer. This drawer is actuated by an energizing signal from circuitry in response to the user removing the presented document from the machine.

To complete the automatic dispensing operation of the dispenser in accordance with the present invention, an article is deposited into the dispensing drawer. Initially, a signal energizes an actuator to position the drawer from a retracted, closed position to a partially opened detent position from which it may be drawn to a full open position by the user. After the user has removed the article and releases the drawer, it automatically returns to the partially opened detent position. A timer measures the time the drawer is in the detent position, and after a preselected interval, as governed by the timer, it returns to the closed position. If, upon initially positioning the drawer to the partially opened detent position, the user does not pull the drawer to the fully open position before the expiration of a preselected time interval, the drawer will be returned to the closed position.

A more complete understanding of the invention and its advantages will be apparent from the specification and claims and from the accompanying drawings illustrative of the invention.

Referring to the drawings.

GENERAL SYSTEM DESCRIPTION

Figure 1:
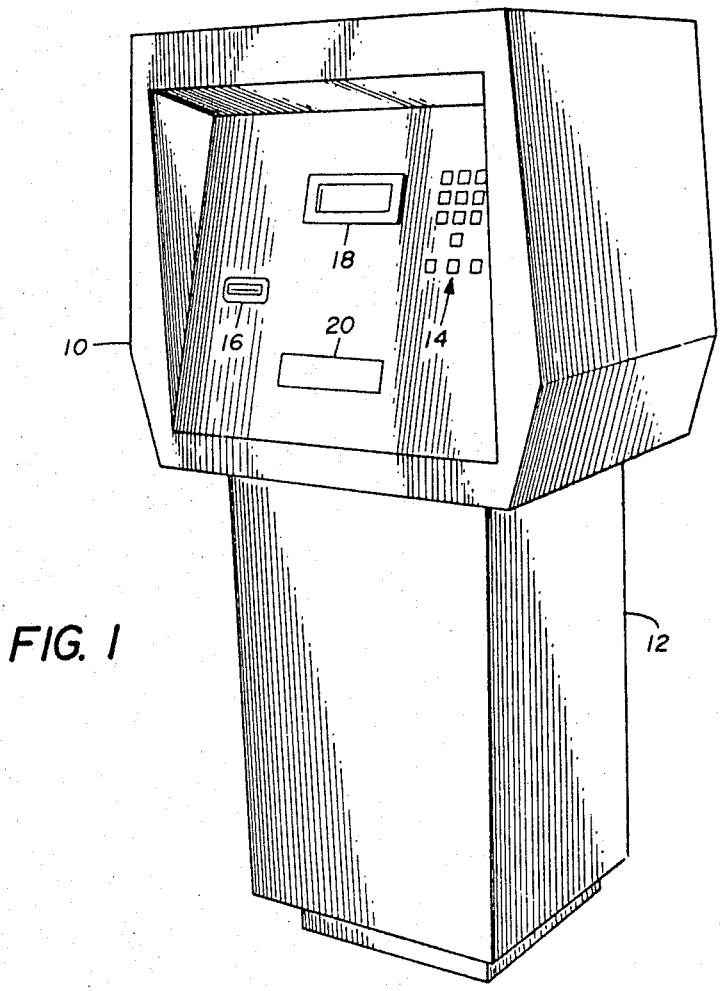
FIG. 1 is a pictorial view of a currency dispenser in accordance with the present invention.

Referring to FIG. 1, there is show a free standing currency dispenser including a console 10 which houses mechanical operation sections of the system, and in addition customer interface equipment. In the free standing unit, the console 10 is mounted on top of an electronic module 12 which houses the system electronics and power supply. On the front panel of the console 10, there is arranged an array of 13 push button keys 14 for use by a customer to interface with the currency dispenser. Ten of these keys, marked 0 through 9, are to enable a user to insert his assigned identification code for verification of his authority to use a credit card presented to the machine through a card gate 16. One of the remaining three keys is a "clear" push button for correcting mistakes made by the user in inserting his assigned identification code. The remaining two keys are for selecting one or two currency packages to be dispensed. The amount of currency in each such package is controlled by authorized personnel.

In addition to the 13 push button keys, and the card gate 16, the front panel of the console 10 includes an instruction window display 18 that provides for viewing an illuminated display message drum. As will be explained, the messages on this drum instruct a user in the operation of the currency dispenser. The last user interface on the front panel of the console 10 is a cash drawer 20 that fits flush with the panel in a closed and locked position.

Figure 2:
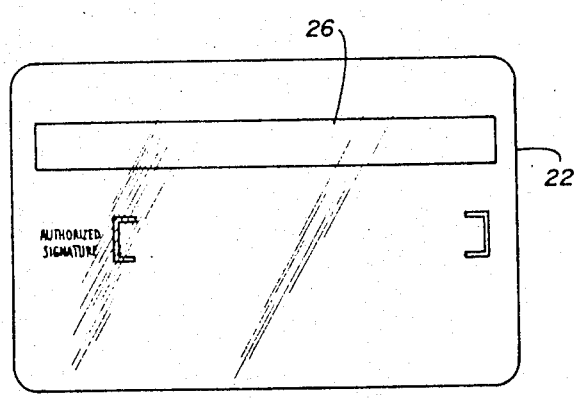
FIG. 2 illustrates a typical credit card for use with the currency dispenser of FIG. 1.

Upon presentation of a credit card 22, such as illustrated in FIG. 2, through the card gate 16 to the console 10, it is transported to a plurality of reading stations by a card reader 24 to activate the various systems in a preordered sequence. Typically, a currency dispenser in accordance with the present invention may be activated by a standard "A" size plastic credit card with a stripe 26 of magnetic material located on the backside. The magnetic stripe allows up to eighty numeric characters in four rows to be magnetically encoded for use in providing a complete identification and record of each transaction with the currency dispenser. A magnetic credit card for use in the system described contains the following information:

a - Expiration Date (Year [two digits] and Month [two digits]), b - Total Allowed Uses (Up to 999 [three digits]), c - Allowed Uses Per Day (Up to 9 [one digit]), d - Account Number (Variable from 6 to 14 digits), e - Customer Identification Code (six digits), f - Bank Routing and Transit Number (eight digits), g - Date Last Used (Month [two digits], Day [two digits]), and number of times used per day (one digit), h - Bank Identification Number (four digits), and i - Bank Branch Number (three digits).

As the credit card 22 moves through the card reader 24, each of the above pieces of information is checked at one of several reading stations. Although many credit card readers are available, the card reader illustrated includes a drive motor 27 activated by a signal from the electronic module 12 and coupled to a series of drive rollers through a belt 28. The series of rollers comprises pinch roller pairs distributed longitudinally along the length of travel of a credit card. In addition to reading stations responsive to the magnetically coded information on the stripe 26, the card reader 24 also includes writing stations for recording a credit card during completion of a currency dispensing operation.

In the normal currency dispensing cycle, a credit card is transported through the card reader 24 in one direction during a first part of a sequence and then returned to the user through the card gate 16 at the second-to-last step in the completion of a cycle. Under certain circumstances, a credit card presented to the machine is retained and not returned to the user. A card retained by the machine is transported through the card reader 24 into an internal storage bin 30. This bin is accessible only to authorized persons having access to the inside of the console 10.

Figure 3:
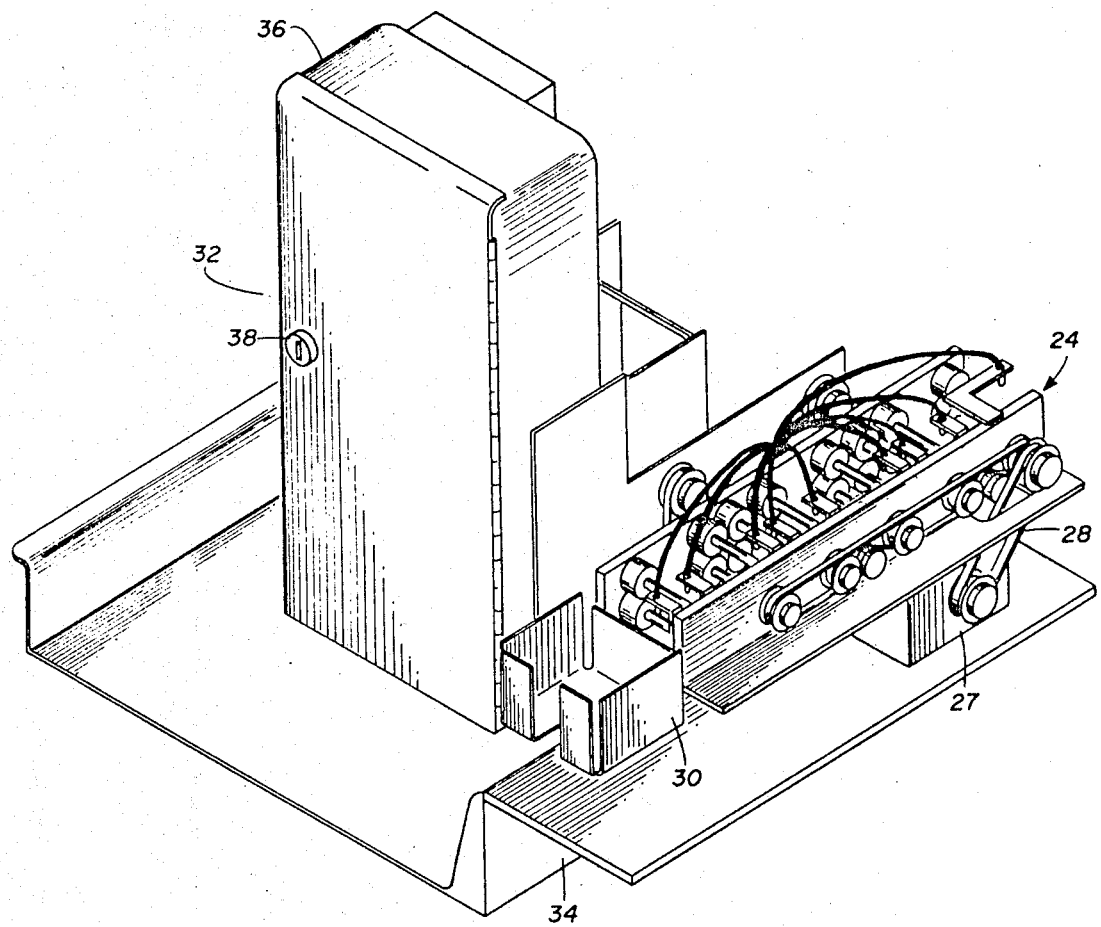
FIG. 3 is a perspective view of a currency packet delivery system and credit card transport system for the dispenser of FIG. 1.

After several verification steps have determined a user is entitled to the currency he has requested, a cash transport 32 is activated by a signal from the electronic module 12 to deliver packets of currency to the cash drawer 20. As illustrated in FIG. 3, the cash transport 32 is mounted alongside the card reader 24 on an equipment rack 34 contained within the console 10. Currency to be dispensed is stored in a cabinet 36 having an opening for feeding packets of currency to a money transport system, as will be explained. Although the console 10 contains security locks to restrict unauthorized entry into the unit, the cabinet 36 also includes a lock 38 for securing money packets stored within the cabinet.

Figure 4:
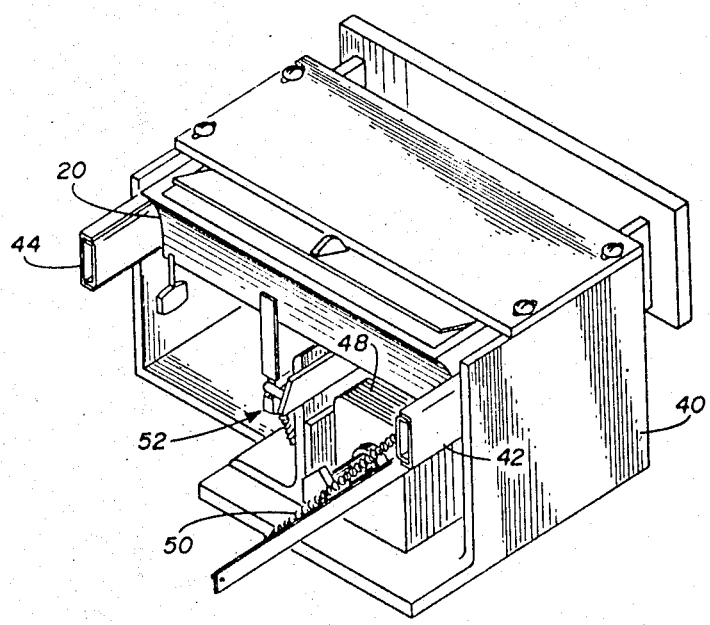
FIG. 4 is a perspective view of the cash drawer for the dispenser of FIG. 1.

Money packets delivered from the cash transport 32 in response to instructions from the electronic module 12 are delivered to the cash drawer 20 included as part of a separate subsystem as illustrated in FIG. 4. The cash drawer 20 is contained within a housing 40 and moves between a closed position as illustrated in FIG. 1 to a partially opened position as illustrated in FIG. 4 along tracks 42 and 44. In addition to numerous switches for sensing the operation of the cash drawer 20, the housing 40 contains a linear motor 48 for forcing the drawer from a closed position to a detent position, as will be explained. Upon receipt of a control signal from the electronic module 12, a latch solenoid is energized and allows a spring 50 to return the drawer 20 to the closed position. A latch mechanism, generally indicated by the numeral 52, locks the drawer 20 in the closed position.

GENERAL SYSTEM OPERATION

In operation of the console 10 and the electronic module 12 to dispense currency to a user, the display 18 instructs a customer to insert his credit card into the card gate 16. This is the first step in a sequence of step-by-step operating instructions leading to a completed transaction.

A second instruction appearing at the display 18 instructs a user to key-in his identification code. This requires that the customer's personal identification number be entered by means of the numbered push button keys 14. By operation of the electronic module 12, the keyed-in number is verified with the number magnetically encoded on the stripe 26 of the customer's credit card 22. If the wrong keys are accidentally pressed before completing a number, the "clear" key is provided to allow the user to try again. On the third incorrect attempt at verification, the card reader 24 delivers the inserted credit card to the bin 30. (This feature is a safeguard against the use of lost or stolen cards.) In this situation, an instruction will appear at the display 18 telling a customer his card has been retained. A printed receipt is then issued telling the user why his card has not been returned.

Following verification, the message "Key In Amount Desired" appears in the lighted display 18. The user now selects one of two fixed amounts, prepackaged in the cash transport 32, by means of one of two currency-amount key push buttons 14. The requested cash amount is delivered to the cash drawer 20 along with a receipt of the transaction. A receipt is printed and issued to a user upon the termination of each transaction whether the transaction has beem completed by the dispensing of currency or by a machine detected error. In the latter situation, the receipt explains to the user why currency was not dispensed.

Upon delivery of the currency and the receipt to the cash drawer 20, the electronic module 12 generates a signal to automatically open the cash drawer to a detent position for delivery of the cash and receipt to the user. The cash drawer 20 must be manually extended to facilitate removal of its contents, after which it is automatically retracted and locked by means of the spring 50 and the latch 52. Upon completion of the latching of the drawer 20, the transaction has been completed and the machine is ready for a subsequent transaction.

DETAILED OPERATING SEQUENCE

Figure 5:
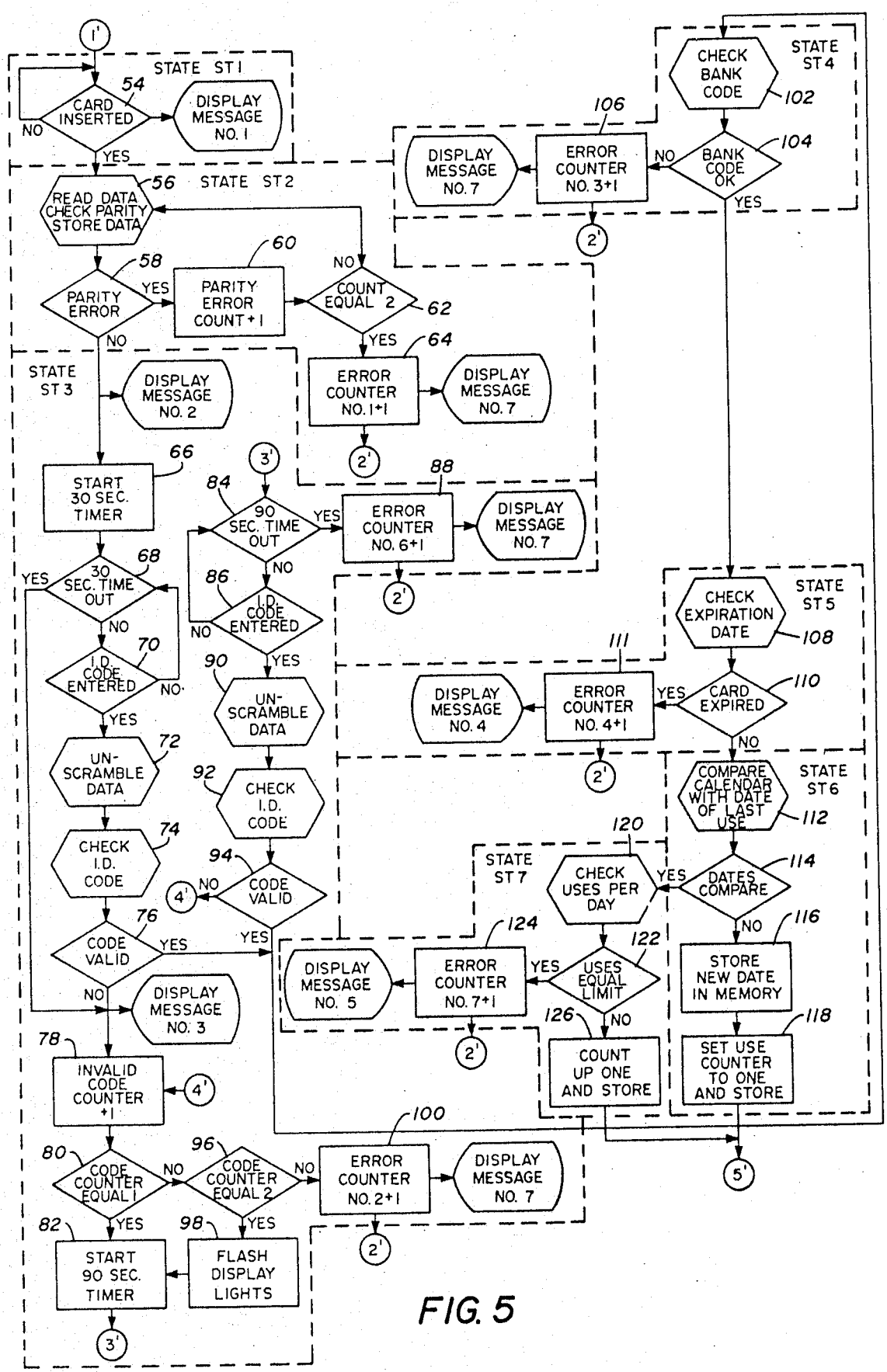
FIGS. 5 through 7 illustrate a flow diagram giving the steps in the operation of the currency dispenser for money delivery to a user of a valid credit card.
Figure 6:
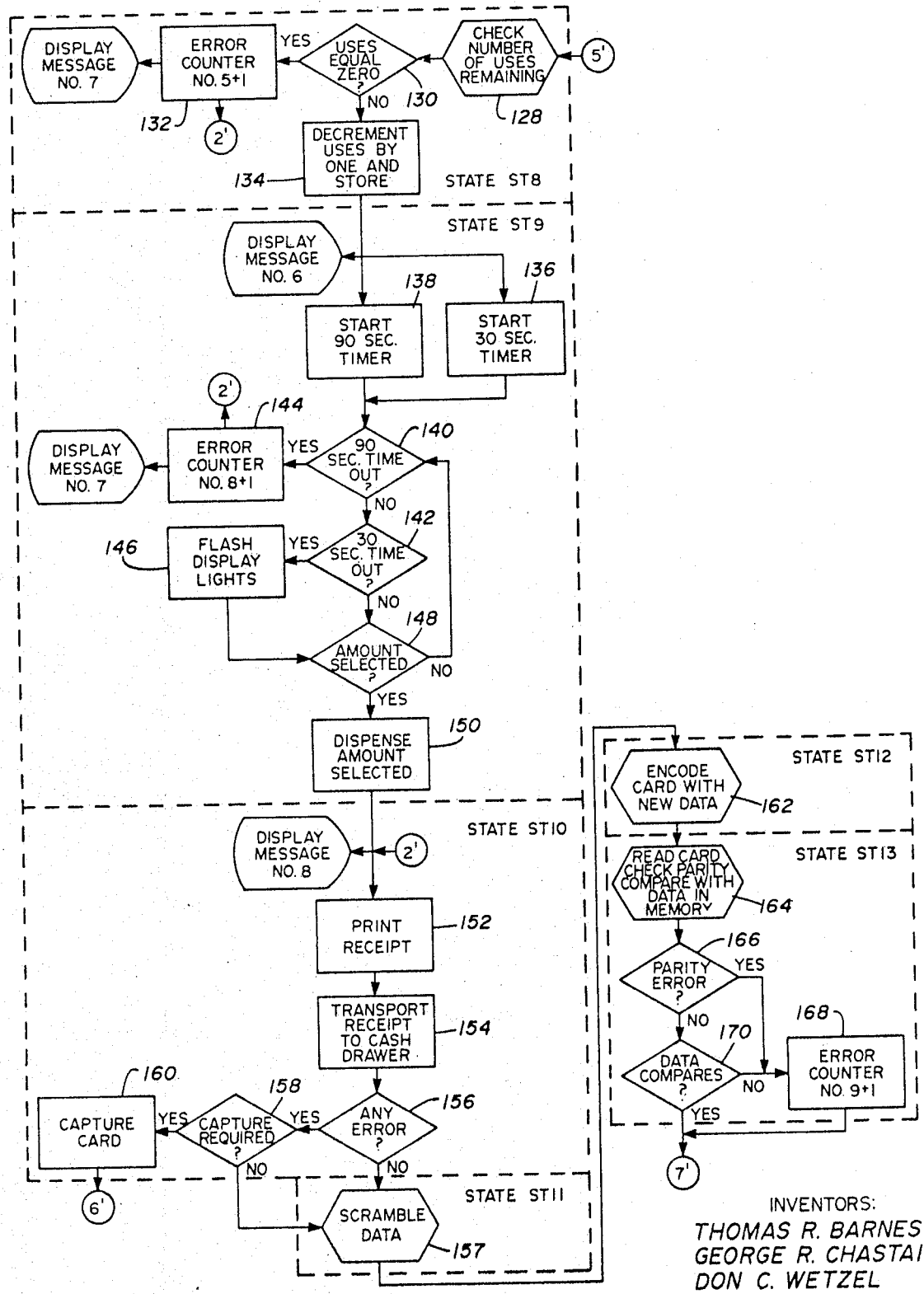
Figure 7:
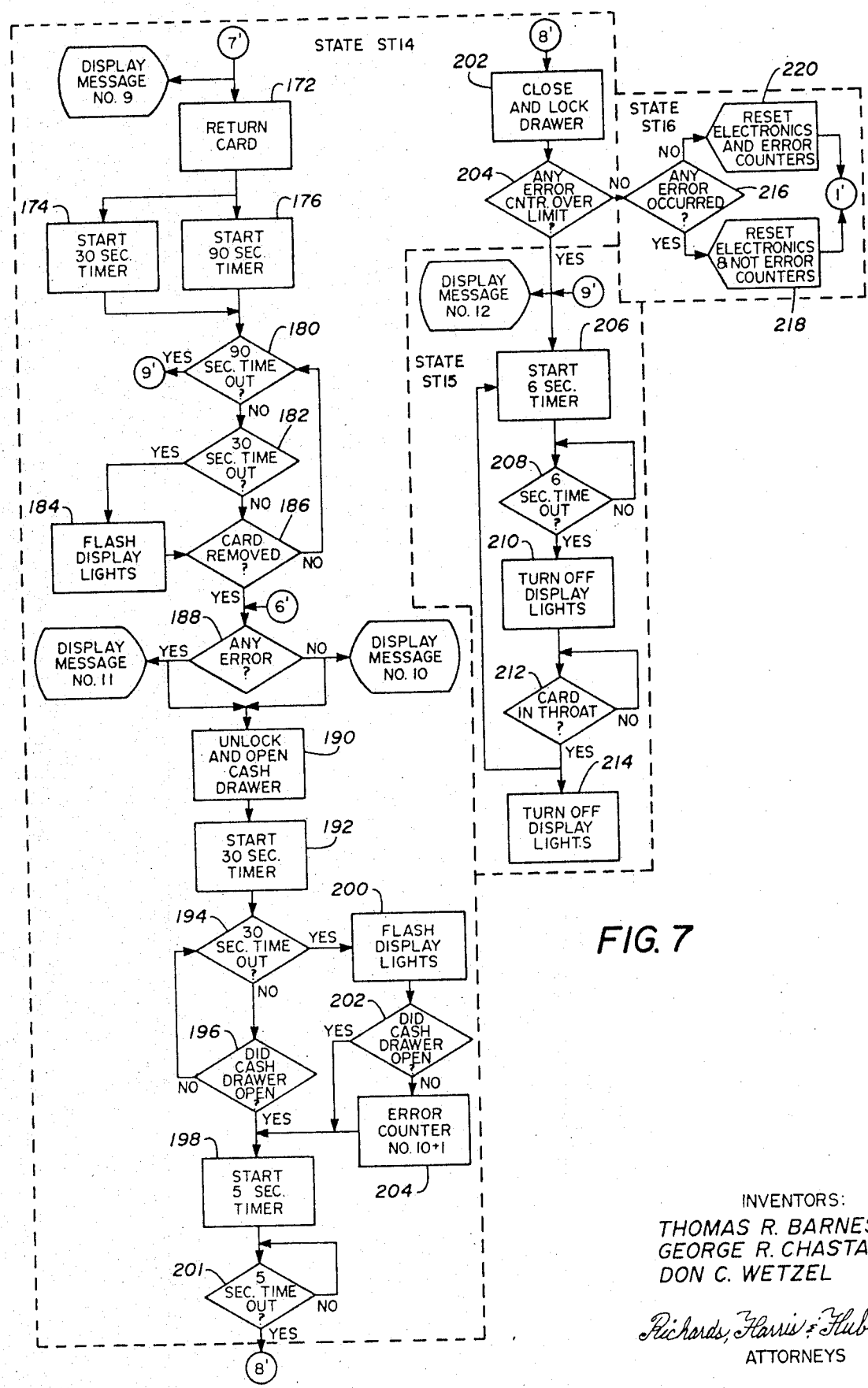

For a detailed operation of the step-by-step sequence of the currency dispenser, reference is made to FIGS. 5 through 7.

In the initial state (ST1) of the currency dispenser, message No. 1 ot Table I will appear at the display 18. Electronic module 12 activates an inquiry 54 to determine if a card has been inserted through the gate 16 after the card format has been checked.

TABLE I
DISPLAY MESSAGES

1. Insert Card
2. Enter I.D. Code
3. Enter I.D. Code Again
4. Card Has Expired
5. Uses Per Day Exceeded
6. Select Amount Desired
7. Transaction Not Complete — Bank will contact you
8. Receipt Being Printed
9. Remove Card
10. Remove Currency and Receipt
11. Remove Receipt
12. Out of Order Upon a positive response from the inquiry 54, the sequence proceeds to state ST2. In state ST2, the card reader 24 positions the advancing credit card, and the module 12 completes step 56 to read the scrambled data from the inserted card, check the partiy, and store the data read from the stripe 26. State ST2 continues with the inquiry 58 to determine if a partiy erro exists. A positive response to the inquiry 58 advances the sequence of state ST2 to step 60 and then to inquiry 62. A "yes" response to inquiry 62 advances state ST2 to step 64 to cause message No. 7 of Table I to appear at the display 18. Step 64 also advances the sequence of operation of state ST10; state ST10 will be explained shortly. A "no"0 response to inquiry 62 returns state ST2 to step 56 and in turn to inquiry 58.

Step 64 makes a check to determine the number of times a parity error has produced a "yes" response to the inquiry 64. If the number of times step 64 has been reached equals an internally set limit, error counter No. 1 of Table 2, then the machine will terminate the present transaction and shut down. For error counter No. 1, on the seventh attempted successive use of the machine which results in a "yes" response to inquiry 62, the machine will shut down. After each successful completion, however, the error counter will reset to zero.

TABLE II
ERROR COUNTER LIMITS

| Counter No. | Limit |
|---|---|
| 1. Parity Error | 6 |
| 2. Invalid I.D. Code | 3 |
| 3. Invalid Bank Code | 6 |
| 4. Expired Card | 3 |
| 5. Total Uses Exceeded | 6 |
| 6. Too Much Time Used To Key In I.D. Code | 3 |
| 7. Uses Per Day Exceeded | 6 |
| 8. Too Much Time Used to Select Amount | 2 |
| 9. Echo Check Error | 3 |
| 10. Drawer Did Not Open | 2 |

A negative response to the "parity error" inquiry 58 advances the sequence of operation to state ST3. Initially, in state ST3, message No. 2 of Table I appears at the display 18. Simultaneously, a 30 second timer, step 66, is initiated by the electronic module 12. Message No. 2 instructs a user to enter his personal identification number into the machine by means of the push button keys 14. When the user is inserting his personal identification number into the machine, the sequence of operation advances to inquiry 68 to determine if the thirty second limit of step 66 has been exceeded. A "no" response to inquiry 68 advances state ST3 to inquiry 70 to determine if a user's identification oce has been entered. If the response to inquiry 70 is "no," the sequence returns to inquiry 68. Inquiries 68 and 70 are continually repeated until either one or the other produces a "yes" response.

A positive positive response from inquiry 70, indicating that a code has been entered, advances state ST3 to step 72 wherein the scrambled coded data, as read from the magnetic stripe 26, is unscrambled. After unscrambling the data from the stripe 26, the sequence advances to step 74 wherein a comparison of the customer-entered identification code with the card identification code is made. Upon completion of the comparison step 74, the electronic module 12 advances the sequence to inquiry 76 to determine if the customer-entered code and the code read from the magnetic stripe 26 are identical. A "no" response to inquiry 76 advances state ST3 to step 78 and causes message No. 3 of Table I to appear at the display 18. State ST3 is also advanced to this same position upon a "yes" response to inquiry 68 indicating that the thirty second timer 66 has timed out.

Step 78 is completed by the electronic module 12 to determine the number of times an incorrect identification code has been entered by the user. This determination is checked by inquiry 80. Upon the first entering of an incorrect identification code by a user, inquiry 80 produces a positive response advancing state ST3 to step 83 which starts a 90 second timer. At this time, the user is instructed to re-enter his identification code through the push button keys 14 in response to message No. 3 appearing at the display 18. The cycle of operation continues at inquiry 84 with the sequence being continuous between step 82 and inquiry 84. A "no" response to inquiry 84 advances the sequence to inquiry 86 to determine if an identification code has been entered. Inquiries 84 and 86 are continuously cycled until either one or the other produces a "yes" response.

A "yes" response to inquiry 84 indicates that the ninety second timer 82 has timed out and state ST3 advances to step 88. Upon completion of step 88, the sequence advances to state ST10 and the transaction is terminated. As a result of state ST3 advancing to step 88, message No. 7 of Table I appears at the display 18.

Step 88 checks to determine how many previous cycles, i.e., previous uses of the machine, have advanced to that point as a result of timing out of the 90 second timer. When the number of times the sequence has advanced to step 88 equals a set error number, the machine will terminate the present transaction and shut down. For a time out error, the machine will shut down after the fourth sequence, error counter No. 6 of Table II, in succession has advanced to step 88 as a result of the 90 second timer timing out.

A "yes" response to the inquiry 86 advances state ST3 to step 90 wherein the data read from the magnetic stripe 26 and stored in step 56 is unscrambled. After completing the unscrambling step 90, the sequence advances to step 92 where the entered identification code and the unscrambled code are compared. This advance state ST3 to inquiry 94 which is made to determine if the user-entered code and the credit card code favorably compare.

A "no" response to the inquiry 94 returns state ST3 to step 78. Inquiry 80 is again made and the response this time will be negative, advancing state ST3 to inquiry 96. This being the second attempt to insert the correct identification code, inquiry 96 produces a "yes" response advancing state ST3 to step 98 which causes the display 18 to flash message No. 3 and return the sequence to the 90 second timer, step 82. The sequence of steps of inquiries 84 through 94 is repeated.

Another "no" response to inquiry 94 again returns the sequence to step 78 and inquiries 80 and 96 are again made. At this time, inquiry 98 will result in a "no" response advancing state ST3 to step 100. In step 100, the electronic module 12 makes an error limit check to determine how many times state ST3 has advanced to this position. When the number of times that state ST3 has advanced to step 100 equals a stored limit, the machine will shut down upon completion of the present invention. For step 100, the error counter No. 2 of Table II gives the number of successive times an incorrect I.D. code will shut down the machine. The present transaction advances to state ST10 and message No. 7 of Table I appears at the display 18. If this is not the fourth successive attempt to use the machine, the present transaction will be terminated and the machine will be returned to the initial state.

A positive response to either inquiry 76 or inquiry 94, indicating a valid code has been entered through the push button keys 14, advances the transaction to step 102 of ST4. In step 102, the module 12 compares the bank code read from the magnetic stripe 26 of the inserted credit card, after unscrambling, with a bank code stored in the module 12. Upon completion of step 102, state ST4 advances to inquiry 104. A "no" response to inquiry 104 advances the sequence to step 106 and message No. 7 of Table I appears at the inquiry 18. Step 106 compares the advances of times the overall sequence has advanced to that state with a preset limit, error counter 3 of Table II. If the number of times the sequence advances to step 106 does not equal the stored limit, the sequence advances to state ST10 and completes the transaction. If the error limit plus one has been reached, the machine will shut down.

A "yes" response to inquiry 104 completes state ST4 and advances the sequence to state ST5. Initially, in state ST5, step 108 is completed. Step 108 is a further check on the data read from the magnetic stripe 26. Step 108 compares the expiration date of the credit card with the calendar date. Inquiry 110 is made and a positive response advances state ST5 to step 112 and message No. 4 of Table I appears at the display 18. In step 112, the module 12 determines the number of times the sequence had advanced to this point, error counter 4 of Table II. If the sequence advances to step 112 once more than the number of times as stored in the module 12, the sequence advances to state ST10 and shuts down. If there has been three or less successive sequences advanced to step 112, the present transaction will be completed and the machine returned to the initial state. A "no" response to inquir 110 completes state ST5 and advanceo the operation to state ST6.

In state ST6, the first operation, step 112, compares the calendar date with the date of last use as read from the magnetic stripe 26. If the calendar date does not agree with the date of last use, indicating the card has not been used that day, inquiry 114 results in a "no" response and state ST6 advances to step 116. Step 116 stores the calendar date in a memory of the electronic module 12 for subsequent encoding of the magnetic stripe 26. Upon completion of storage of the calendar date, state ST6 advances to step 118. Step 118 sets a use counter to 1 and stores this information in a memory for subsequently encoding on the magnetic strip 26.

A "yes" response to the inquiry 114, indicating that the card has been previously used on the calendar date, advances the sequence from state ST6 to state ST7. In state ST7, step 120 compares the number of uses made for that day with an established use limit. If the number of uses of the card in the card reader 24 equals the established limit, an inquiry 122 results in a "yes" response thereby advancing state ST7 to step 124 and message No. 5 of Table I appears at the display 18. In step 124, the electronic module 12 compares the number of times the sequence has advanced to that point with a stored number, error counter 7 of Table II. If state ST7 advances to step 124 by an amount equal to the stored limit plus one, indicating seven successive uses of the machine have advanced the sequence to step 124, the machine will complete the present transaction by advancing to state ST10 and then shut down. If less than seven successive uses has advanced the sequence to step 124, the present transaction will be completed through state ST10 and the machine returned to the initial state.

A "no" response to inquiry 122 advances state ST7 to step 126 which adds another use to the total number of uses per day and stores this information for subsequent encoding on the magnetic stripe 26.

Upon completion of either step 118 of state ST6 or step 126 of state ST7, the machine operation advances to state ST8, as appears in FIG. 6. Initially, in state ST8, step 128 compares the number of total uses made of the credit card with the total number of allowed uses. Note that this is not the uses allowed per day, but rather the total number of uses that can be made of a credit card. If the number of total uses remaining equals zero, an inquiry 130 results in a "yes" response advancing state ST8 to step 132 and causing message No. 7 of Table I to appear at the display 18. In step 132, the electronic module 12 checks to determine the number of times state ST8 has advanced to this point, error counter 5 of Table II. If it has advanced to the total number of times allowed, the sequence will advance to state ST10 and complete the present transaction by retaining the card and printing a receipt advising the user his card has been retained. A "no" response to the inquiry 130 indicates that another use of the credit card 22 remains and state ST8 advances to step 134. Step 134 reduces the total number of remaining uses by 1 and advances the sequence to state ST9.

Initially, in state ST9, message No. 6 of Table I appears at the display 18 and the 30 second timer of step 136 and the 90 second timer of step 138 are activated. Electronic module 12 monitors both the ninety second timer, step 138, and the 30 second timer, step 136, by inquiries 140 and 142, respectively. Inquiry 140 checks the 90 second timer of step 138. If the 90 second timer has timed out, inquiry 140 results in a "yes" response advancing state ST9 to step 144 and causing message No. 7 to appear at the display 18. Step 144 is one of those that checks the operation of the complete system. In step 144, the module 12 evaluates the number of times the ninety second timer has timed out, error counter 8 of Table II. If the number of times step 144 has been reached equals the number stored in the module 12 plus one, the machine will complete the present transaction and shut down. If the limit has not been reached, the present transaction will be completed and the machine returned to the initial state. The present transaction is completed by advancing the sequence from step 144 to state ST10.

A "no" response to the inquiry 140 advances state ST9 to inquiry 142 which checks the 90 second timer, step 136. If the 30 second timer has timed out, inquiry 142 produces a "yes" response thereby initiating step 146 which produces a flashing display 18. The message at 18 will be to instruct the user to select the amount of currency desired to be dispensed. Upon either a "no" response to the inquiry 142 or upon completion of step 146, state ST9 advances to the inquiry 148. If an amount of currency to be dispensed has not been selected by the user, inquiry 148 results in a "no" response thereby returning the sequence to inquiry 140. After a user has selected the amount of currency to be dispensed, the inquiry 148 produces a "yes" response and state ST9 advances to step 150. Step 150 activates the cash transport 32 to deliver the number of required currency packets to the cash drawer 20. After delivery of the currency packets to the cash drawer 20, state ST9 is completed and the sequence advances to state ST10.

Initially, in state ST10, message No. 8 of Table I appears at the display 18 and step 152 is completed. In step 152, the electronic module 12 activates a receipt printer to generate a receipt of the transaction. This receipt is transported to the cash drawer 20 in step 154. Upon completion of step 154, state ST10 advances to inquiry 156. Inquiry 156 is made to determine if state ST10 has been reached through states ST1 to ST10 in a normal sequence, or whether an error has advanced the sequence, out of order, to state ST10. In the latter situation, when an error has advanced the sequence to state ST10, the sequence advances to inquiry 158. Inquiry 158 is made to determine whether the error requires the capture of the credit card in the reader 24. A "yes" response will result from inquiry 158 when (1) three attempts have been made to insert an identification code, all of which were erroneous, (2) the expiration date of the card has passed, or (3) the total number of uses has been reached. The result of a "yes" response to inquiry 158 advances the sequence to step 160 wherein the electronic module 12 activates the card reader 24 to deliver the card to the storage bin 30. After completion of step 160, the sequence advances to state ST14, shown in FIG. 7.

If the sequence of operation of the machine has advanced to state ST10 through a normal operating cycle, the inquiry 156 produces a "no" response. This completes state ST10 and advances the operation to step 157 of state ST11. A "no" response to the inquiry 158 also completes state ST10 and advances the sequence to state ST11. The only step completed in state ST11 is that of rescrambling the data to be stored on the magnetic stripe 26.

Upon completion of the scrambling technique, the sequence advances to state ST12 wherein step 162 encodes the magnetic stripe 26 with the scrambling updated data. Step 162 comprises the entire operation of state ST12; upon completion of the encoding of the credit card, the sequence advances to state ST13.

In state ST13, the first operation, step 164, reads the encoded card to check the parity and compare the updated data with data stored in memory in the electronic module 12. Upon completion of step 164, inquiry 166 is made to determine if there are any parity errors. A parity error produces a "yes" response to inquiry 166 and advances the sequence to step 168. Step 168 is an error determining step for checking the overall operation of the machine, error counter 9 of Table II. When the state ST13 has reached step 168, the module 12 checks to determine now many previous occasions this step has been reached. If it equals a preset number of times plus one, four in this case, the sequence advances to complete the present transaction and the machine shuts down. Step 168 will be reached if the result of inquiry 168 is positive or if the inquiry to 170 is negative. Inquiry 170 is made when the inquiry 166 results in a negative answer.

A positive response to the inquiry 170 completes state ST13 and advances the sequence to state ST14, FIG. 7. Upon reaching state ST14, message No. 9 of Table I appears at the display 18 and a return card step 172 is completed. The return card step 172 is preformed by the card reader 24 giving the user access to his credit card through the card gate 16. Upon returning the credit card 22 to the card gate 16, a thirty second timer of step 174, and a ninety second timer of step 176, are activated. Following activation of these timers, an inquiry 180 is made to determine if the ninety second timer has timed out before the user removes his card. If the inquiry 180 produces a "yes" response indicating that the ninety second timer of step 176 has timed out, the remainder of state ST14 is bypassed and the sequence advances to state ST15.

A "no" response to the inquiry 180 indicates that the 90 second timer is still running and the sequence advances to the inquiry 182. Inquiry 182 is made to determine if the thirty second timer of step 174 has timed out. A "yes" response to the inquiry 182 advances the sequence to step 184. In step 184, the electronic module 12 flashes message No. 9 of Table I on the display 18 in an effort to attract the user's attention. Upon completion of step 184, that is, flashing the display 18, the sequence of state ST14 advances to inquiry 186. State ST14 also advances to inquiry 186 upon a negative response from the inquiry 182.

Inquiry 186 is made to determine if the user has removed his credit card from the card gate 16. A "no" response to this inquiry returns the sequence to inquiry 180. A positive response to the inquiry 186, indicating that the user has removed his credit card, advances the sequence to inquiry 188. Inquiry 188 is also activated upon a positive response to the inquiry 158 of state ST10. A positive response to inquiry 188 causes message No. 11 of Table I to appear at the display 18 and a negative response to this inquiry causes message No. 10 of Table I to appear at the display 18. In either case, state ST14 advances to step 190. In step 190, the electronic module 12 activates the latch 52 and energizes the linear motor 48 to position the cash drawer 20 to the detent position. At the same time a 30 second timer of step 192 is activated. Inquiry 194 is made as a check to determine when the timer of step 192 has timed out. A negative response to step 194 advances the sequence of state ST14 to inquiry 196. Inquiry 196 is made to determine if the cash drawer has to be extended to facilitate removal of its contents. A "no" response to inquiry 196 returns the sequence to inquiry 194. A "yes" response to inquiry 196 advances the sequence of state ST14 to step 198.

State ST14 also advances to step 198 upon a positive response to the inquiry 194. Such a response advances the sequence to step 200 which is a flashing light operation to cause the display 18 to flash either message No. 10 or message No. 11. After the flashing operation has commenced, inquiry 202 is made to determine if the cash drawer 20 has been extended to remove the contents thereof. A "no" response to the inquiry 202 advances the sequence to step 204 which is an error counter operation. In step 204, the electronic module 12 checks to determine in how many successive sequences has the drawer not been opened after advancing to this step. If the step 204 has been activated a number of times equal to a preset value stored in the electronic module 12, error counter 10 of Table II, the system will complete the present transaction and shut down.

Upon a "yes" response to the inquiry 202 or upon a completion of the step 204, state ST14 advances to step 198. Step 198 includes a 5 second timer for timing how long the cash drawer is held in the detent position after being manually extended. Upon starting the 5 second timer of step 198, inquiry 201 is made to check the operation of the timer. A "no" response to the inquiry 201 indicates that the five second timer has not timed out and inquiry 201 is continuously made until a positive response results.

A positive response to the inquiry 201 advances the sequence to step 202 which activates the latch 52 to allow the spring 50 to automatically retract the cash drawer 20. A latch then locks the cash drawer 20 until the next transaction.

Upon completion of the step 202, an inquiry 204 is made. Inquiry 204 is made to determine if any of the error counter steps have been activated. If any of the error counting steps have been activated, the inquiry 204 produces a positive response.

A positive response to the inquiry 204 completes state ST14 and advances the sequence to state ST15. The sequence of state ST15 is also initiated as the result of a positive response to the inquiry 180 of state ST14. Initially, message No. 12 of Table I appears at the display 18 and a step 206 is activated to start a six second timer. The entire purpose of state ST15 is to display message No. 12 and turn off the display lights. This state includes inquiry 208 which cycles until the timer of step 206 has timed out. At that time, the inquiry 208 produces a "yes" response thereby activating step 210 to turn off the display lights. State ST15 is completed by inquiry 212 and step 214.

If the inquiry 204 results in a negative response, indicating that currency was dispensed without activating any of the error counting steps, the sequence advances to state ST16. State ST16 is a state in which the machine resets itself in preparation for another cycle. Initially, in state ST16, an inquiry 216 is made. A positive response to inquiry 216 activates step 218 and a negative response activates step 220. Both steps 218 and 220 ready the console 10 for inquiry 54 of state ST1.

STATE SEQUENCING

Figure 8:
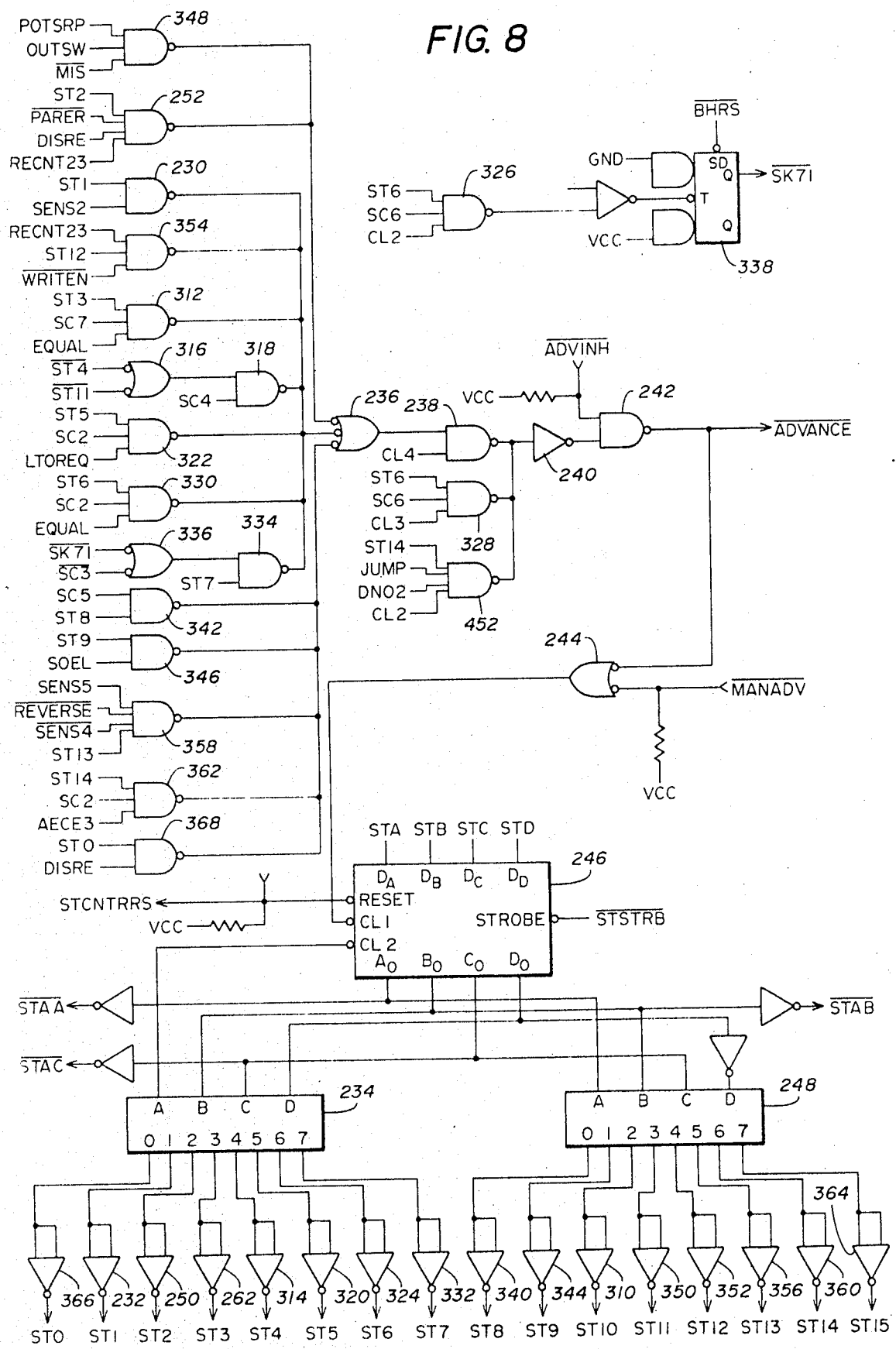
FIG. 8 is a schematic of state counter logic for advancing the dispensing sequence through states ST1 through ST16 of FIGS. 5 through 7.
Figure 9:
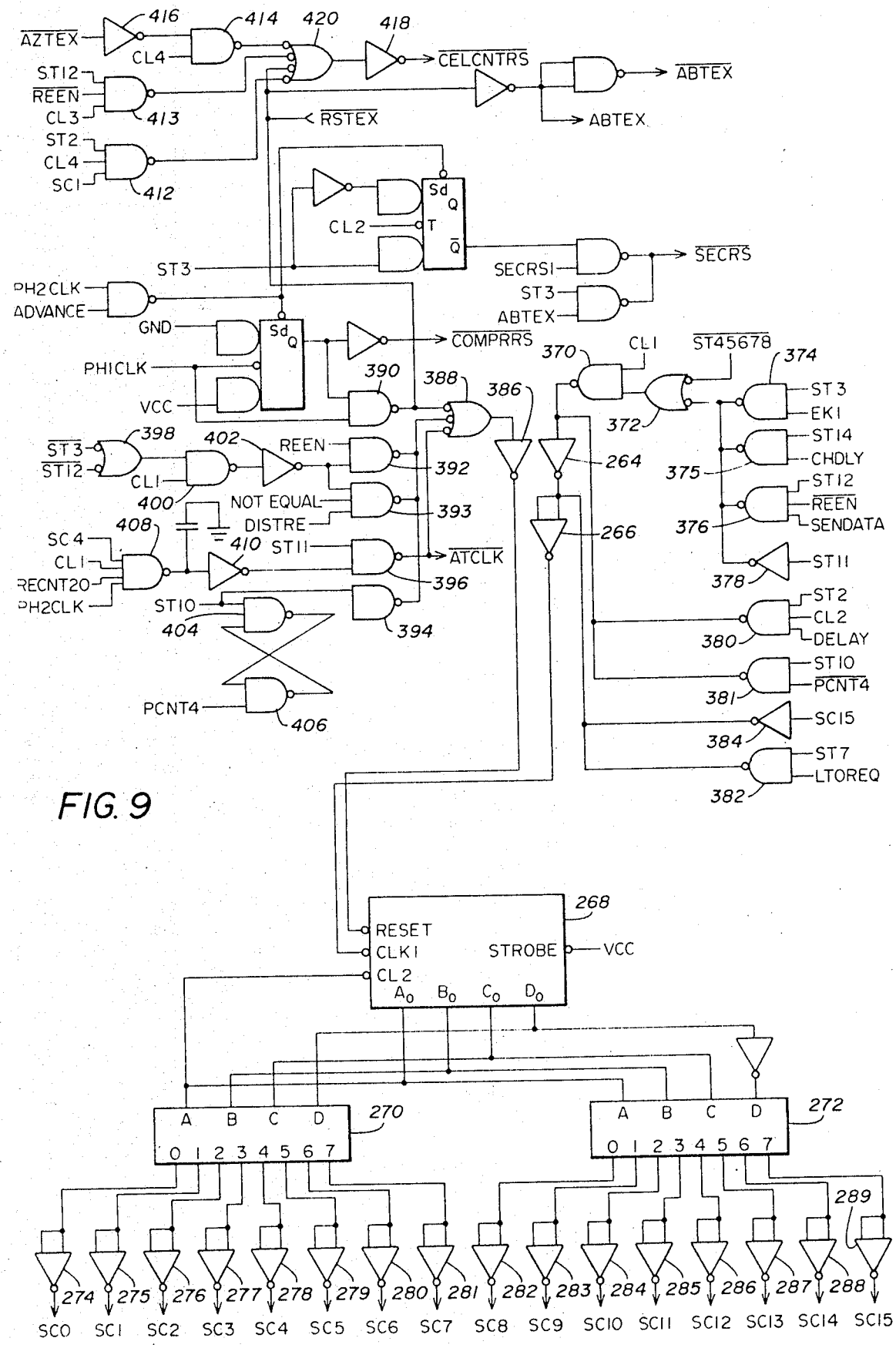
FIG. 9 is a schematic of substate counter logic for advancing each of the states to the various steps and inquiries.
Figure 10:
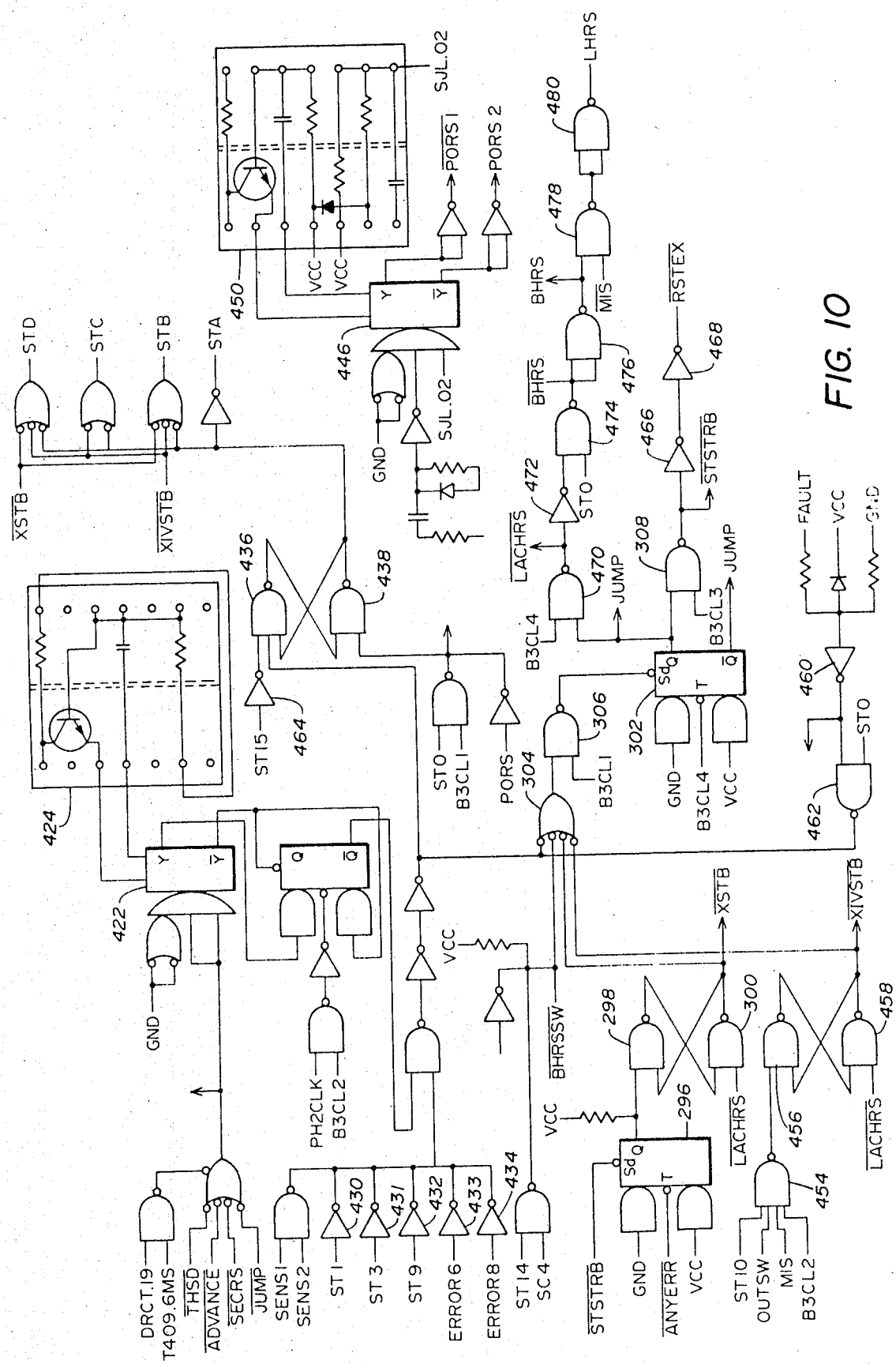
FIG. 10 is a logic diagram of a jump state logic circuit for advancing the sequence to skip various states of the sequence.

To advance the dispensing sequence through the various states of FIGS. 5 through 7, the electronic module 12 includes the logic circuits of FIGS. 8 through 10, in addition to other circuitry for operation of the various subsystems.

Referring to FIG. 8, when message No. 1 of Table I appears at display 18, the dispenser is in state ST1 and signal ST1 appears at one input of NAND gate 230. Throughout the logic circuits of FIGS. 8 through 10, the various NAND gates and NOR gates will be referred to as NANDS or NORS, eliminating the repetition of the gate description. The ST1 signal at the NAND 230 is generated at the output of an inverting amplifier 232 coupled to one output terminal of a 1 of 8 decoder 234.

When a user of the cash dispenser inserts his credit card through the gate 16, a card sensor (not shown) generates the signal SENS 2 at the second input to the NAND 230. The output of the NAND 230 now changes logic levels with the signal applied to one of three inputs of NOR 236. When both inputs to the NAND 230 are at the same logic level, state ST1 is complete and the sequence advances to state ST2.

To advance to state ST2, a logic ZERO input to the NOR 236 appears as a logic ONE at one input of NAND 238 which also receives clock signal CL4 at a second input terminal. Thus, when state ST1 is complete and the clock signal CL4 is generated, the output of the NAND 238 changes logic levels. An output of NAND 238 is applied through an inverter amplifier 240 to NAND 242 having a second input ADVINH. An output of NAND 242 is an ADVANCE signal applied through NOR 244 to the CL1 input of a 16 to 1 counter 246.

Outputs of the counter 246 are applied to the gating terminals of the 1 of 8 decoder 234 and a 1 of 8 decoder 248. When the NAND 230 generates a logic ZERO signal to the NOR 236, the decoder 234 advances from terminal two to terminal three, thereby producing a signal ST2 at the output of an inverting amplifier 250.

The signal ST2 is applied to one input of a NAND 252 signifying that the system is now in state ST2. Initially, the DISRE (display ready) signal and the RECNT23 signal change to a logic ONE level. With the completion of step 56 (FIG. 5), the inquiry 58 is made; a negative response produces the signal PARER at the fourth input to NAND 252. State ST2 is now complete and the counter 246 advances the decoder 234, through the NOR 236 and the NAND 242, to produce a signal ST3 at the output of an inverting amplifier 262.

Generating the signal ST3 at the output of the amplifier 262 indicates the sequence has advanced to state ST3. The ST3 signal is applied to one input of a NAND 312. Sequencing steps and inquiries of state ST3 are now completed in the order described with each advancing in turn by means of the substate counter logic of FIG. 9. When the signal SC7, which indicates the substate logic has advanced through substates SC0 to SC7, appears at the input of the NAND 312, this NAND is conditioned to receive a positive response from either inquiry 76 or inquiry 94. A positive response from either of these two inquiries results in the signal EQUAL appearing at the NAND 312 and state ST3 is complete. A pulse at the CL1 terminal of the counter 246 now advances the decoder 234 and the signal ST4 is generated at the output of an inverting amplifier 314.

The dispensing sequence has now advanced to state ST4 with the signal ST4 appearing at one input of NOR 316. When the substate logic has advanced through five substates SC0 through SC4, NAND 318 is conditioned to activate the counter 246 to advance the decoder 234. Advancing the decoder 234 results in the signal ST5 appearing at the output of an inverting amplifier 320.

At this time, the sequence has advanced to state ST5 and the signal ST5 appears at one input of a NAND 322. State ST5 checks the credit card expiration date through two substates. When the signal SC2 of the substate logic and the signal LTOREQ are applied to the NAND 322 along with the signal ST5, state ST5 is complete and the output of the NOR 244 advances the counter 246. The decoder 234 in turn advances to generate the signal ST6 at the output of an inverting amplifier 324.

The signal ST6 indicates that the sequence has advanced to state ST6. This signal is applied to an input of NANDs 326, 328 and 330. When the substrate counter logic generates the signal SC2, the inquiry 114 (FIG. 5) is made. A "yes" response to the inquiry 114 results in the signal EQUAL appearing at the third input to the NAND 330, thereby advancing the counter 246 and in turn the decoder 234. The signal ST7 is now generated at the output of an inverting amplifier 332.

In state ST7, the uses per day are checked and ST7 signal is applied to NAND 334 which also had an input connected to NOR 336. NOR 336 generates a logic ONE signal when the substate counter logic produces the signal SC3. This indicates that steps 120 and 126 along with inquiry 122 have been completed. State ST7 is now completed and the sequence advances.

Returning to state ST6, if the results of inquiry 114 produce a "negative" answer, then NAND 330 will not produce the advancing signal to the counter 246. Instead, the substate counter continues to advance the sequence of state ST6. The substate counter logic generates the signal SC6 to NANDs 326 and 328 as the clock pulses advance from CL2 to CL3. When the clock pulse CL2 is applied to NAND 326, the flip-flop 338 changes states and the output of NOR 336 goes to the logic ONE level by means of the SC71 signal. Now, when the clock pulse CL3 is generated, NAND 328 advances the counter 246 and the signal ST7 is generated at the output of the inverting amplifier 332. This signal is applied to NAND 334 which already has a logic ONE level signal. NAND 334 immediately advances the counter 246 and the decoder 248 generates a signal ST8 at the output of an inverting amplifier 343, thereby skipping state ST7.

This same condition results when the step 126 (FIG. 5) of state ST7 is completed as indicated by the signal SC3 appearing at NOR 336.

With the signal ST8 at the output of the amplifier 340, the sequence has advanced to state ST8 (FIG. 6). The signal ST8 is applied to NAND 342 and the substate counter commences to sequentially generate the substate signals. When the substate counter generates the signal SC5, the state ST8 is completed and the NAND 342 generates a logic ONE signal applied to the NOR 236. This causes the counter 246 to advance the decoder 248 and the signal ST9 is generated at the output of an inverting amplifier 344.

The sequence of operation is now advanced to state ST9 with the signal ST9 applied to a NAND 346. In state ST9, a user selects the amount of currency desired and the cash transport 32 delivers this currency to the cash drawer 20. Upon the completion of this operation, a signal SOEL appears at the second input to the NAND 346 and the counter 246 advances the decoder 248 with the signal ST10 appearing at the output of the inverting amplifier 310.

The sequence has now advanced to state ST10 wherein a receipt of the transaction is printed. In state ST10, the inquiry 156 is made to determine if any errors were detected in any of the previous nine states. If no errors were made in the previous nine states, then the signal $\overline{\text{MIS}}$ is applied to NAND 348 which generates a logic ONE to the NOR 236. This advances the counter 246 and in turn the decoder 248. The decoder 248 now produces a signal ST11 at the output of an inverting amplifier 350.

When the signal ST11 appears at the input of NOR 316, the sequence has advanced to state ST11. NOR 316 now applies a logic ONE to one input of the NAND 318. The substate counter logic generates the signal SC4 in turn and the NAND 318 changes logic levels to advance the counter 246 signifying the completion of the scrambling of data in state ST11. The decoder 248 advances, thereby generating the signal ST12 at the output of an inverting amplifier 352.

The system is now operating in state ST12 which comprises the step 162 of recoding the credit card 122 with updated scrambled data. A signal ST12 is applied to one input of NAND 354. With signal RECNT23 at a second input to the NAND 354 and upon completion of the recoding of the credit card 22, a signal $\overline{\text{WRITEN}}$ appears at the third input of the NAND 354. This signifies completion of state ST12 and the counter 246 advances the decoder 248 to generate a signal ST13 at the output of an inverting amplifier 356.

In state ST13, the recoded credit card is checked for parity errors and the signal ST13 is applied to one input of a NAND 358. When all four inputs to the NAND 358 are at the logic ONE level, the state ST13 is completed and the counter 246 advances the decoder 248 to generate the signal ST14 at the output of an inverting amplifier 360.

In state ST14, the credit card is returned to the user through the gate 16. The cash transport 32 has previously been conditioned in state ST13. The signal ST14 is applied to NANDs 362 and 452, the latter a jump state gate. When the NAND 362 also receives the signal SC2 and the signal AECE3 at two additional inputs, it generates a logic ONE output at the completion of state ST14. The counter 246 and the decoder 248 are advanced to generate a signal ST15 at the output of an inverting amplifier 364. For the sequence to advance to state ST15, the inquiry 204 (FIG. 7) produced a "yes" response. This "yes" response resulted in generating the signal AECE (any error counter exceeded) appearing at the NAND 362. In state ST15, display message No. 12 of Table I appears at the display 18 indicating that the machine is out of order. This causes the machine to shut down and it will not accept another transaction.

If the inquiry 204 of state ST14 results in a negative response, then the signals STB and STD are applied to the counter 246 to advance the decoder 248 to skip the inverting amplifier 364 and advance the decoder 234 to produce the signal ST0 at the output of an inverting amplifier 366.

The machine is now operating in state ST16 with the signal ST0 applied to NAND 368. After the various subsystems have been reset and the display message No.1 of Table I appears at the display 18, the signal DISRE (display ready) appears at NAND 368. The counter 246 now advances the decoder 234 to produce the signal ST1 at the output of the inverting amplifier 234. The cash dispenser now is reset to accept another transaction by inserting a credit card in the gate 16.

Referring to FIG. 9, there is shown a logic system for generating the substate signals SC0 through SC15 for each of the states ST1 through ST16. Substate signals SC0 through SC15 appear at outptus of inverting amplfiers 274 through 289, respectively, with the amplifiers 274 through 281 having inputs connected to a decoder 270 and amplifiers 282 through 289 having inputs connected to a decoder 272. Decoders 270 and 272 are advanced by output pulses from a counter 268.

To advance the counter 268, a signal is applied to the CLK1 terminal from an inverting amplifier 266. The inverting amplifier 266 connects to an inverting amplifier 264 which is connected to the output of NAND 370. NAND 370 has a clock signal CL1 from the master clock, and a second input from the output of NOR 372. NOR 372 has one input terminal to which signals $\overline{\text{ST4}}$, $\overline{\text{ST5}}$, $\overline{\text{ST6}}$, $\overline{\text{ST7}}$, and $\overline{\text{ST8}}$ are applied, and a second input terminal connected to the outputs of NANDs 374 through 376 and the output of an inverting amplifier 378. Thus, when the NOR 372 has a logic ZERO at either of its two inputs, the counter 268 advances under the control of the clock pulse CL1. When both inputs to the NOR 372 are logic ONE, the clock pulse CL1 no longer controls the counter 268. The counter 268 is also advanced by the output signals of NANDs 380 through 382 and by the output of an inverting amplifier 384.

Each of the NANDs 374 through 376 and 380 through 382 has an input terminal connected to one of the ST state signals from the state counter logic of FIG. 8. The inverting amplifier 378 has an input from the inverting amplifier 350 and the inverting amplifier 384 receives the signal SC15 from the inverting amplifier 289. A signal at the inverting amplifier 384 advances the substate counter from SC15 to SC0.

At the completion of each state sequence, the counter 268 is reset by a pulse applied to the RESET terminal. Resetting the counter 268 activates the decoder 270 to generate the signal SC0 at the output of the inverting amplifier 274. The reset signal is generated at the output of an inverting amplifier 386 coupled to NOR 388 having one input connected to NAND 390, a second input connected to NANDs 392 through 294, and a third input connected to the output of NAND 396. NANDs 392 and 393 actuate the counter 268 to reset after states ST3 and ST12 by means of NOR 398, NAND 400, and an inverting amplifier 402. For state ST10, the NAND 394 will reset the counter 268. The NAND 394 has one input connected to a latch circuit including NANDs 404 and 406. NAND 396 resets the counter 268 in state ST11 by a circuit that includes NAND 408 and an inverting amplifier 410.

In addition to the substate signals, the logic system of FIG. 9 also generates a clear counter signal for resetting the error counters as in steps 218 and 220 of FIG. 7. The clear counter signal is generated by a circuit that includes NANDs 412 through 414, inverting amplifiers 416 and 418, and NOR 420.

In states ST2 through St6 and states ST8 and ST9, the sequence will jump to state ST10 when certain error conditions exist. To jump the sequence to state ST10, the jump logic circuit of FIG. 10 generates the necessary logic signals. To advance the sequence to state ST10 from state ST3 as a result of a positive response from the inquiry 84, a flip-flop 422, connected to a timing circuit 424 and receiving an input from NOR 426, generates a logic advance signal to a flip-flop 425 which in turn produces a logic ONE signal to NAND 428. When the NAND 428 receives a second logic ONE signal from either of the inverting amplifiers 430 through 434, a latch circuit including NANDs 436 and 438 reverses its logic level, thereby applying a logic ZERO to an inverting amplifier 440 and NORs 442 through 444. The inverting amplifier 440 and the NORs 442 through 444 have outputs connected to the counter 246 of FIG. 8.

Another signal that changes the logic level of the latch consisting of NANDs 436 and 438 is the output from a flip-flop 446 connected through an inverting amplifier 448. The flip-flop 446 connects to a timing circuit 450.

With the dispensing sequence in state ST10 as a result of advancing out of order, the inquiry 156 will produce a positive response. This applies the signal ANYERR to the flip-flop 296 which has an output to a latch circuit of NANDs 298 and 300. An output of the NAND 300 is the signal XSTB which connects to one input of the NORs 442 and 444 for advancing the counter 246 if the inquiry 158 produces a "no" response. If the inquiry 158 produces "yes" response, indicating that the credit card is to be captured, a logic ZERO output of the NAND 300 is applied to NOR 304 which connects to a NAND 306. NAND 306 connects to a flip-flop 302 which generates the signal JUMP connected to one input of NAND 452 (FIG. 8).

With the sequence in state ST10, the output of the inverting amplifier 310 is applied to NAND 454 having an output connected to a latch circuit including NANDs 456 and 458. When all four inputs to NAND 454 are logic ONE, the output is logic ZERO, indicating that the card has been captured. An output of the NAND 458 is applied to NORs 442 through 444 to advance the sequence to inquiry 188 of state ST14.

When the sequence is in state ST14 with the signal JUMP at one input to NAND 452. FIG. 8, the sequence will advance to either state ST15 or state ST16, as explained. If the sequence advances to state ST15, a FAULT signal is applied to an inverting amplifier 460 having an output connected to NAND 462. NAND 462 connects to NAND 436.

Also connected to NAND 436 is the output of an inverting amplifier 464 which has an input from the inverting amplifier 364. With the signal ST15 applied to the inverting amplifier 464, the counter will be disenabled by NAND 436.

In addition to the signal JUMP applied to NAND 452, the output of the flip-flop 302 is also applied to NAND 308 to generate the STSTRB signal, i.e., the strobe signal, to the cunter 246. The output of NAND 308 connects to inverting amplifiers 466 and 468 to generate the signal RSTEX. In a parallel circuit, the signal JUMP is one input to NAND 470 having an output through an inverting amplifier 472 to NAND 474. NAND 474 also receives the signal STo from the inverting amplifier 366, and generates a reset signal through NAND 476. The reset signal BHRS is applied throughout the circuit for resetting the various elements. The reset signal is also applied to NAND 478 which connects to NAND 480 for generating the signal LHRS, also a reset signal.

With the logic of FIGS. 8 through 10, the cash dispensing sequence of FIGS. 5 through 7 is completed as described. When in state ST9, step 150 activates the cash transport 32 to dispense the amount selected into the cash drawer 20. The cash transport system described herein is further described and claimed in the co-pending Application Ser. No. 58,888, filed July 28, 1970, Pat. No. 3,685,690 issued Aug. 22, 1972 of Marion R. Karecki, George R. Chastain and Thomas R. Barnes.

After completing state ST10, the updated data is scrambled in state St11. The method of unscrambling data in accordance with coding keys and rescrambling data in accordance with other coding keys described herein is described and claimed in the co-pending application Ser. No. 59,146, filed July 29, 1970, now U.S. Pat. No. 3,662,343 issued May 9, 1972 of Kenneth S. Goldstein and John D. White.

With the completion of the inquiry 188 of state ST14, the cash drawer 20 is unlocked for removal of the contents thereof by a user. The cash drawer of the dispensing system described herein is described and claimed in the co-pending application Ser. No. 59,156, filed July 29, 1970, now U.S. Pat. No. 3,651,986 issued Mar. 28, 1972 of Marion R. Karecki and Thomas R. Barnes.

The card transport and gate control system described herein is described and claimed in the co-pending application Ser. No. 59,241, filed July 29, 1970, now U.S. Pat. No. 3,715,569 issued Feb. 6, 1973 of John R. Hicks and William C. Bortzfield.

While only one embodiment of the invention, together with the modifications thereof, has been described in detail herein and shown in the accompanying drawings, it will be evident that various other modifications are possible without departing from the scope of the invention.

What is claimed is:

1. A method of machine dispensing currency in response to coded data on a document presented to the machine, comprising the steps of:
    reading the coded data on the document,
    comparing the coded data with a verification code inserted and stored in the machine for verification of the validity of the presented document,
    updating the coded data after document verification to reflect the currency dispensing transaction,
    encoding the updated coded data onto a document to be removed from the machine, and
    delivering a selected currency amount upon presentation of a properly verified document.

2. A method of machine dispensing currency as set forth in claim 1 wherein the step of comparing the read coded data with a verification code includes the step of comparing a read bank code with a stored bank code for verification of the document validity.

3. A method of machine dispensing currency as set forth in claim 1 wherein the step of comparing the read coded data with the verification code includes the step of comparing a read expiration date code with a stored document expiration data code for verification of the document validity.

4. A method of machine dispensing currency as set forth in claim 3 including the step of transporting the presented document to a capture storage bin when the comparison of the read expiration date with the stored document expiration date code indicates that the expiration date of the presented document is past.

5. A method of machine dispensing currency as set forth in claim 1 wherein the step of comparing the read coded data with the verification code includes the step of comparing a read date of last use code with a stored calendar date code for verification of the date of last use of the presented document.

6. A method of machine dispensing currency as set forth in claim 1 wherein the step of comparing the read coded data with the verification code includes the step of comparing a read code of uses per day with a stored uses per day code for verification of the document validity.

7. A method of machine dispensing currency as set forth in claim 1 wherein the step of comparing the read coded data with the verification code includes the step of comparing a read total number of uses with a sotred total allowed uses code for verification of the document validity.

8. A method of machine dispensing currency as set forth in claim 7 including the step of transporting the presented document to a capture storage bin when the comparison of the read total number of uses with the stored total allowed uses code verifies that the presented document has been used to the established limit.

9. A method of machine dispensing currency as set forth in claim 1 including the step of transporting the presented document to a capture storage bin when the comparison of the read coded data with the inserted portion of the verification code fails to verify the document validity.

10. A method of machine dispensing currency in response to scrambled data on a document presented to the machine, comprising the steps of:
unscrambling the data on the document into a series of separate clear data words,
comparing the clear data words for document identification with a verification code inserted and store in the machine for verification of the validity of the presented document,
updating the clear data to reflect the currency dispensing transaction,
rescrambling the updated clear data and recoding a document to be removed from the machine, and
delivering a selected currency amount upon presentation of a properly verified document.

11. A method of machine dispensing currency as set forth in claim 10 wherein the step of delivering a selected currency amount includes the step of transporting currency to a cash drawer subsequent to the step of recoding the presented document to be removed.

12. A method of machine dispensing currency as set forth in claim 10 wherein the step of comparing the clear data words with a verification code includes the step of comparing a clear bank identification word with a stored bank code for verification of the document validity.

13. A method of machine dispensing currency as set forth in claim 10 wherein the step of comparing the clear data words with a verification code includes the step of comparing a clear document expiration date code with a calender date code for verification of the document validity.

14. A method of machine dispensing currency as set forth in claim 10 wherein the step of comparing the clear data words with a verification code includes the step of comparing a clear date of last use word with a stored calendar date code for verification of the document validity.

15. A method of machine dispensing currency as set forth in claim 10 wherein the step of comparing the clear data words with a verification code includes the step of comparing a clear number of document uses per day word with a stored uses per day code for verification of the document validity.

16. A method of machine dispensing currency as set forth in claim 10 wherein the step of comparing the clear data words with a verification code includes the step of comparing a clear total number of previous document uses word with a stored total allowed uses code for verification of the document validity.

17. A method of machine dispensing currency in response to scrambled data on a document presented to the machine, comprising the steps of:
reading the scrambled data on the document,
unscrambling the data read from the document into a series of separate clear data words,
entering a user identification code into the system,
comparing the clear data words with a verification code that contains the identification code and a code stored in the machine for verification of the validity of the presented document,
updating the clear data to reflect the currency dispensing transaction,
rescrambling the updated clear data,
recoding the presented document with the updated rescrambled data,
delivering a selected currency amount upon presentation of a properly verified document to a cash drawer, and
unlocking the cash drawer containing the currency to be dispensed.

18. A method of machine dispensing currency as set forth in claim 17 including the step of checking the read data for parity errors prior to unscrambling into clear data words.

19. A method of machine dispensing currency as set forth in claim 18 including the step of comparing the scrambled data recoded onto the document to be removed from the machine with the scrambled updated data as a check of the recoded data.

20. A method of machine dispensing currency as set forth in claim 19 wherein the step of comparing the clear data words with a verification code includes the step of comparing a clear bank identification word with a stored bank code for verification of the document validity.

21. A method of machine dispensing currency as set forth in claim 19 wherein the step of comparing the clear data words with a verification code includes the st4p of comparing a clear document expiration date word with a stored calendar date code for verification of the document validity.

22. A method of machine dispensing currency as set forth in claim 21 including the step of transporting the presented document to a capture storage bin when the comparison of the clear data word representing the document expiration with the calendar date code verifies that the expiration of the presented document has passed.

23. A method of machine dispensing currency as set forth in claim 19 wherein the step of comparing the clear data words with a verification code includes the step of comparing a clear date of last use of the presented document with a stored calendar date code for verification of the last use of the presented document.

24. A method of machine dispensing currency as set forth in claim 23 wherein the step of updating the clear data includes updating the word representing the date of last use to reflect the present calendar date of usage.

25. A method of machine dispensing currency as set forth in claim 19 wherein the step of comparing the clear data words with a verification code includes the step of comparing a clear word representing the allowed uses per day of the presented document with a stored uses per day code for verification of the document validity.

26. A method of machine dispensing currency as set forth in claim 25 wherein the step of updating the clear data includes updating the word representing the allowed uses per day to reflect an additional use of the presented document.

27. A method of machine dispensing currency as set forth in claim 19 wherein the step of comparing the clear data words with a verification code includes the step of comparing a clear word representing the total allowed number of uses of the document presented with a stored total allowed uses code for verification of the document validity.

28. A method of machine dispensing currency as set forth in claim 27 wherein the step of updating the clear data includes updating the word representing the total number of uses of the presented document to reflect an additional usage.

29. A method of machine dispensing currency as set forth in claim 28 including the step of transporting the presented document to a capture storage bin when the comparison of the clear data word representing total number of uses with the stored total allowed uses verifies that the presented document has been used to the established limit.

30. A method of machine dispensing currency as set forth in claim 19 including the step of transporting the presented document to a capture storage bin when the comparison of the clear word for user identification with the entered identification code fails to verify the document validity.

31. A method of machine dispensing currency in response to scrambled coded data on a document presented to the machine comprising the steps of:
  reading the scrambled data on the document,
  unscrambling the read data into a series of separate clear data words,
  comparing the clear data word for user identification with an inserted user identification code for verification of the validity of the presented document,
  comparing the clear data word representing a bank identification with a stored bank code for further verification of the document validity,
  comparing the clear data word representing the presented document expiration date with a stored calendar date code for further verification of the document validity,
  comparing the clear data word representing the date of last use of the presented document with a stored calendar date for verification of the date of last use of the presented document,
  comparing the clear data word representing the allowed uses per day with a stored uses per day code for further verification of the document validity,
  comparing the clear data word representing the total number of uses of the document presented with a stored total allowed uses code for further verification of the document validity,
  transporting a selected currency amount from a cash dispenser to a cash drawer upon complete verification of the document validity,
  updating the clear data to reflect the date of last use of the presented document, an additional use per day of the presented document, and an additional total number of uses,
  rescrambling the updated clear data,
  recoding the updated scrambled coded data onto the document to be subsequently removed from the machine, and
  unlocking the cash drawer containing the currency to be dispensed.

32. A method of machine dispensing currency as set forth in claim 31 including the step of checking the read data for parity errors prior to unscrambling into clear data words.

33. A method of machine dispensing currency as set forth in claim 32 including the step of comparing the scrambled data recoded onto the document to be removed from the machine with the scrambled updated data as a check of the recoded data.

34. A method of machine dispensing currency as set forth in claim 33 including the step of transporting the presented document to a capture storage bin when the comparison of the clear data word representing the document expiration with the calendar date code verifies that the expiration of the presented document has passed.

35. A method of machine dispensing currency as set forth in claim 34 including the step of transporting the presented document to a capture storage bin when the comparison of the clear data word representing total number of uses with the stored total allowed uses verifies that the presented document has been used to the established limit.

36. A method of machine dispensing currency as set forth in claim 35 including the step of transporting the presented document to a capture storage bin when the comparison of the clear word for user identification with the entered identification code fails to verify the document validity.

37. A dispenser responsive to coded data on a document presented to the machine, comprising:
  first means for storing a verification code inserted into the machine,
  second means interconnected to said first means for comparing coded data read from the presented document with the stored verification code for verification of the validity of the presented document,
  third means interconnected to said second means for updating the coded data after document verification to reflect a dispensing transaction,
  encoding means interconnected to said third means for transferring the updated coded data onto a document to be removed from the machine, and
  means responsive to said second means for delivering a dispensable article from the dispenser upon presentation of a properly verified document.

38. A dispenser responsive to coded data on a document as set forth in claim 37 including means responsive to said second means for transporting the presented document to a capture storage bin when the comparison of the coded data read from the presented document with the stored verification code indicates the presented document is invalid.

39. A dispenser responsive to coded data on a document as set forth in claim 37 wherein said second means includes means for unscrambling the coded data read from the presented document into a series of clear words for comparison with the stored verification code.

40. A dispenser responsive to scrambled coded data on a document presented thereto, comprising:
  first means for unscrambling coded data read from the presented document into a series of clear data words,
  second means for inserting a users identification code into the system,
  third means interconnected with said first and second means for comparing the clear data words with a verification code that includes the identification code and a code stored in the system for verification of the validity of the presented document,
  fourth means interconnected to said third means for updating the clear data to reflect a dispensing transaction,
  fifth means responsive to the updated clear data for rescrambling the updated data,
  sixth means interconnected to said fifth means for recoding the presented document with the updated rescrambled data, and
  seventh means responsive to said third means for delivering a dispensable article from the dispenser upon presentation of a properly verified document.

41. A currency dispenser responsive to scrambled coded data on a document presented thereto and including a cash dispenser and a cash drawer, comprising:
  first means for reading the scrambled coded data on the document,
  second means connected to said first means for unscrambling the read data into a series of separate clear data words,
  third means interconnected to said second means for comparing the clear data words for user identification with an inserted user identification code for verification of the validity of the presented document,
  fourth means responsive to said third means for transporting a selected currency amount from the cash dispenser to the cash drawer upon verification of the document validity,
  fifth means interconnected to said third means for updating the clear data to reflect the use of the presented document,
  sixth means connected to said fifth means for rescrambling the updated clear data,
  encoding means connected to said sixth means for transferring the updated scrambled data onto the document to be subsequently removed from the system, and
  means responsive to said encoding means for releasably unlocking the cash drawer containing the currency to be dispensed.

42. In a currency dispenser as set forth in claim 44 wherein said third means includes means for comparing a clear data word representing a bank identification with a stored bank code for further verification of the document validity.

43. In a currency dispenser as set forth in claim 42 wherein said third means further includes means for comparing a clear data word representing the presented document expiration date with a stored calendar date code for further verification of the document validity.

44. In a currency dispenser as set forth in claim 43 wherein said third means further includes means for comparing a clear data word representing the date of last use of the presented document with a stored calendar date for further verification of the date of last use of the presented document.

45. In a currency dispenser as set forth in claim 44 wherein said third means further includes means for comparing a clear data word representing the allowed uses per day of a presented document with a stored uses per day code for further verification of the document validity.

46. In a currency dispenser as set forth in claim 45 wherein said third means further includes means for comparing a clear data word representing the total number of uses of a presented document with a stored total allowed uses code for further verification of the document validity.

* * * * *

UNITED STATES PATENT OFFICE
CERTIFICATE OF CORRECTION

Patent No. 3,761,682            Dated      September 25, 1973

Inventor(s)   Thomas R. Barnes, George R. Chastain and Don C. Wetze

It is certified that error appears in the above-identified patent and that said Letters Patent are hereby corrected as shown below:

Col. 2, line 9, "comparision" should be --comparison--.
Col. 3, line 31, "show" should be --shown--;
      line 33, "operation" should be --operating--.
Col. 4, line 28, "recording" should be --recoding--.
Col. 5, line 58, "ot" should be --of--.
Col. 6, line 15, "partiy" should be --parity--;
      line 17, "partiy" should be --parity--;
      line 17, "erro" should be --error--;
      line 24, delete "0";
      line 64, "oce" should be --code--.
Col. 7, line 1, delete the second occurrence of "positive";
      line 24, "83" should be --82--;
      line 45, "transation" should be --transaction--;
      line 55, "advance" should be --advances--.
Col. 8, line 10, "invention" should be --transaction--;
      line 21, after "of" insert --state--;
      line 27, "inquiry" should be --display--;
      line 28, "advances" should be --number--;
      line 52, "inquir" should be --inquiry--;
      line 53, "advanceo" should be --advances--.
Col. 10, line 2, "90" should be --30--;
      line 57, "scrambling" should be --scrambled--.
Col. 11, line 3, "now" should be --how--;
      line 59, "to be" should be --been--.

UNITED STATES PATENT OFFICE
CERTIFICATE OF CORRECTION

Patent No. 3,761,682    Dated September 25, 1973

Inventor(s) Thomas R. Barnes, George R. Chastain & Don C. Wetzel

It is certified that error appears in the above-identified patent and that said Letters Patent are hereby corrected as shown below:

Col. 16, line 4, "outptus" should be --outputs--;
        line 5, "lfiers" should be --lifiers--.
Col. 17, line 48, "counter" should be --system--;
        line 53, "cunter" should be --counter--.
Col. 18, line 9, "Stll" should be --ST11--;
        line 57, "data" should be --date--.
Col. 19, line 13, "sotred" should be --stored--;
        line 34, "store" should be --stored--.
Col. 20, line 51, "st4p" should be --step--.
Col. 24, line 15 "44" should be --41--.

Signed and sealed this 23rd day of July 1974.

(SEAL)
Attest:

McCOY M. GIBSON, JR.    C. MARSHALL DANN
Attesting Officer       Commissioner of Patents

Disclaimer 3,761,682.—*Thomas R. Barnes*, Dallas, *George R. Chastain*, Irving and *Don C. Wetzel*, Dallas, Tex. CREDIT CARD AUTOMATIC CURRENCY DISPENSER. Patent dated Sept. 25, 1973. Disclaimer filed Jan. 5, 1983, by the assignee, *Docutel Corp.*

Hereby enters this disclaimer to claims 1–9 and 37–39 of said patent.

[*Official Gazette March 15, 1983.*]